US005238082A

United States Patent [19]

Stegeman et al.

[11] Patent Number: 5,238,082
[45] Date of Patent: * Aug. 24, 1993

[54] PERSONAL MOBILITY VEHICLE

[75] Inventors: Aaron H. Stegeman; Ronald F. Bechler, both of George, Iowa

[73] Assignee: Ranger All Season Corp., George, Iowa

[*] Notice: The portion of the term of this patent subsequent to Sep. 29, 2009 has been disclaimed.

[21] Appl. No.: 929,292

[22] Filed: Aug. 12, 1992

Related U.S. Application Data

[62] Division of Ser. No. 691,703, Apr. 26, 1991, Pat. No. 5,150,762.

[51] Int. Cl.⁵ .............................................. B60K 1/00
[52] U.S. Cl. ..................................... 180/208; 280/263; 280/270
[58] Field of Search ................. 180/208; 280/263, 270

[56] References Cited

U.S. PATENT DOCUMENTS

| | | | |
|---|---|---|---|
| 3,249,171 | 5/1966 | Kinghorn | 180/27 |
| 3,388,761 | 6/1968 | Arpin | 180/27 |
| 4,037,678 | 7/1977 | Braume | 180/11 |
| 4,452,327 | 6/1984 | Mowat et al. | 180/11 |
| 4,570,739 | 2/1986 | Kramer | 180/216 |
| 4,892,166 | 1/1990 | Gaffney | 180/208 |
| 4,944,359 | 7/1990 | Doman et al. | 180/208 |
| 5,020,624 | 6/1991 | Nesterick et al. | 180/208 |
| 5,036,938 | 8/1991 | Bount et al. | 180/208 |
| 5,150,762 | 9/1992 | Stegeman et al. | 280/270 |

FOREIGN PATENT DOCUMENTS 2617455  1/1989  France ................. 180/208

Primary Examiner—H. Grant Skaggs
Attorney, Agent, or Firm—Kinney & Lange

[57] ABSTRACT

A personal mobility vehicles includes front and rear frames which are connected together in use. The rear frame supports the rear axle and drive wheels, as well as the electric motor/brake system. The front frame supports a front wheel spindle to which one or more front wheels are attached. A tiller is mounted to the front spindle, the tiller being collapsible for storage of the vehicle. A seat post is mounted to the front frame for supporting a removable seat, and a floor pan is mounted to the front frame to support the vehicular batteries, as well provide a foot rest for the rider.

The front and rear frames are preferably connected together with a plate having a depending J-hook arranged to engage a plate having a depending lip. A latch and latch receiver serve to lock the connection together with the plates bearing against each other in compression to support the vehicle and rider.

The tiller is preferably positionable in a plurality of lock positions, including one collapsed position for compact storage.

2 Claims, 5 Drawing Sheets

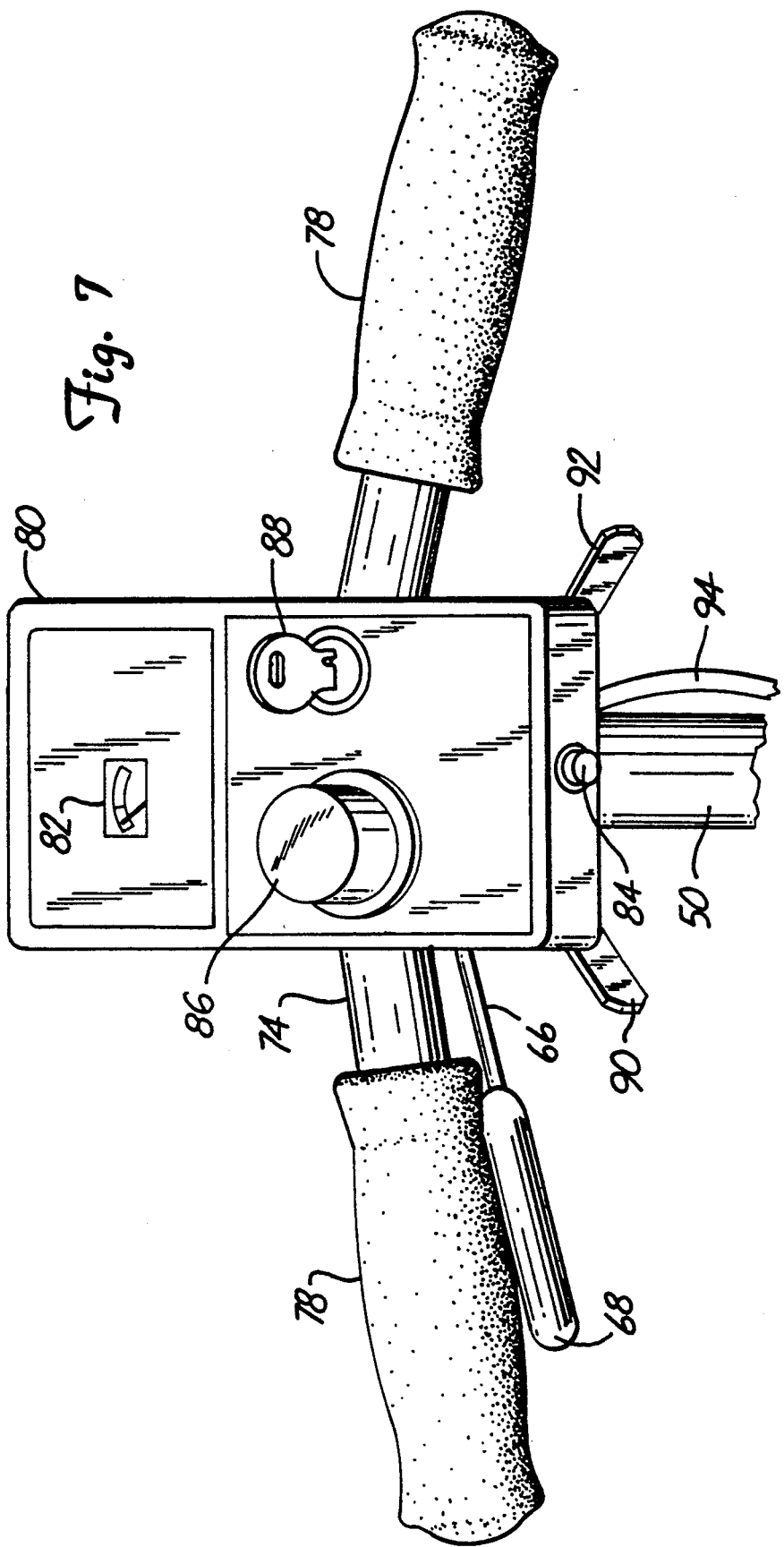

PERSONAL MOBILITY VEHICLE

This is a continuation of application Ser. No. 07/691,703 filed Apr. 26, 1991, now U.S. Pat. No. 5,150,762 granted Sep. 29, 1992.

BACKGROUND OF THE INVENTION

This invention relates to personal mobility vehicles, and particularly to a self-propelled scooter which is easily assembled and disassembled.

Personal mobility vehicles have reached widespread acceptance for use by persons with partial and total walking disabilities. Personal mobility vehicles are generally more rugged, and employ wider tires, than wheelchairs so they may be maneuvered over terrain not generally accessible by wheelchairs. Personal mobility vehicles are self-propelled and generally have the appearance of a downsized golf cart.

In use, most personal mobility vehicles are capable of being disassembled for storage and/or transportation, such as in the trunk of an automobile. Consequently, it is important that each of the several units comprising the disassembled vehicle be as lightweight as possible, not exceeding about fifty pounds. Further, assembly and disassembly of the vehicle should be reasonably simple so that users can disassemble and reassemble the vehicle in a few minutes without complicated procedures. Thus the connection mechanism for connecting frame portions of the vehicle should be simple to operate to both assemble and disassemble the vehicle, should provide a positive connection which cannot be compromised by the user, and should be able to withstand forces imposed by the weight of the rider and stresses during assembly and disassembly. Therefore, in addition to the rugged design such vehicles should be of relatively simple design.

Unfortunately, personal mobility vehicles have not fully met the foregoing goals. Particularly, the connection mechanisms for connecting the front and rear frame units of prior personal mobility vehicles have required a sophisticated level of manual dexterity to operate. For example, the front and rear frame units of many prior vehicles are assembled by slidably attaching mating rods or frame portions on opposite sides of the respective front and rear units, and attaching the rods or frame portions with pins. Examples of such devices can be found in the Kinghorn U S. Pat. No. 3,249,171, and Kramer U.S. Pat. No. 4,570,739. While such vehicles may be readily dismantled by removing the pins and withdrawing one set of tubes from the other, more than casual dexterity is required to align the separate rods or frame portions on the two sides of the vehicle during assembly, often while the mating frame portions are held in an elevated position by the user. Also, it is not an easy chore to align the pin holes on the mating frame portions for insertion of the safety pin. If the user becomes frustrated by the safety pin and omits its reinsertion, the vehicle could become inadvertently disassembled during use, leading to a highly dangerous condition. Further, the weights of the vehicle and rider cause a bending stress at the junction of the mating tubes, thereby weakening the connection mechanism and causing eventual misalignment, thereby increasing the difficulty of assembly and necessitating costly repair and correction.

Others have suggested a hinge and hinge pin arrangement to fasten the frames together, together with a support strut to brace the frame. However, such arrangements are subject to the same difficulties as the Kinghorn and Kramer structures, with the additional difficulty that a substantial amount of stress is imposed on the pin itself. Arpin U.S. Pat. No. 3,388,761 discloses an example of this latter arrangement. Mowat et al. U.S. Pat. No. 4,452,327 overcomes many of the alignment problems associated with the Kinghorn, Kramer and Arpin arrangements by employing a hook and bar assembly, but the Mowat et al. arrangement creates an undesirable sheer stress on the connection mechanism.

Braume U.S. Pat. No. 4,037,678 overcomes many of the structural difficulties of other vehicles by employing a J-hook flange and lip mechanism arranged so that portions of the frame bear in compression against each other. However, Braume requires bolts and nuts to hold the assembly together, so the vehicle is not easily assembled and disassembled.

The present invention overcomes the difficulties of the prior art by providing a connector mechanism which operates in compression to support the weight of the vehicle and rider, provides a positive connection whose safety cannot be compromised, and is quickly and easily assembled and disassembled.

SUMMARY OF THE INVENTION

The present invention optimizes the design of personal mobility vehicles by providing a frame assembly comprising front and rear frames which are connected together in use. The rear frame supports the rear axle and drive wheels, as well as the motor system. The front frame supports a front wheel spindle to which one or more front wheels are attached. A tiller is mounted to the front spindle, the tiller being collapsible to a storage position for compact storage of the vehicle. A seat post is mounted to the front frame for supporting a removable seat, and a floor pan is mounted to the front frame to support the vehicular batteries, as well provide a foot rest for the rider.

One feature of the invention resides in the provision of a simple, rugged connection mechanism between the front and rear frames to provide a positive, lockable connection which supports the weights of the vehicle and rider in compression.

Another feature of the present invention resides in the provision of a simple mechanism for adjusting and collapsing the tiller.

BRIEF DESCRIPTION OF THE DRAWINGS

FIG. 7 is an enlarged view of the handles and vehicular controls of the vehicle illustrated in FIG. 1 as viewed by an operator; and FIG. 8 is a top view of a portion of the vehicle illustrated in FIG. 1.

DETAILED DESCRIPTION OF THE PREFERRED EMBODIMENT

Figure 1:
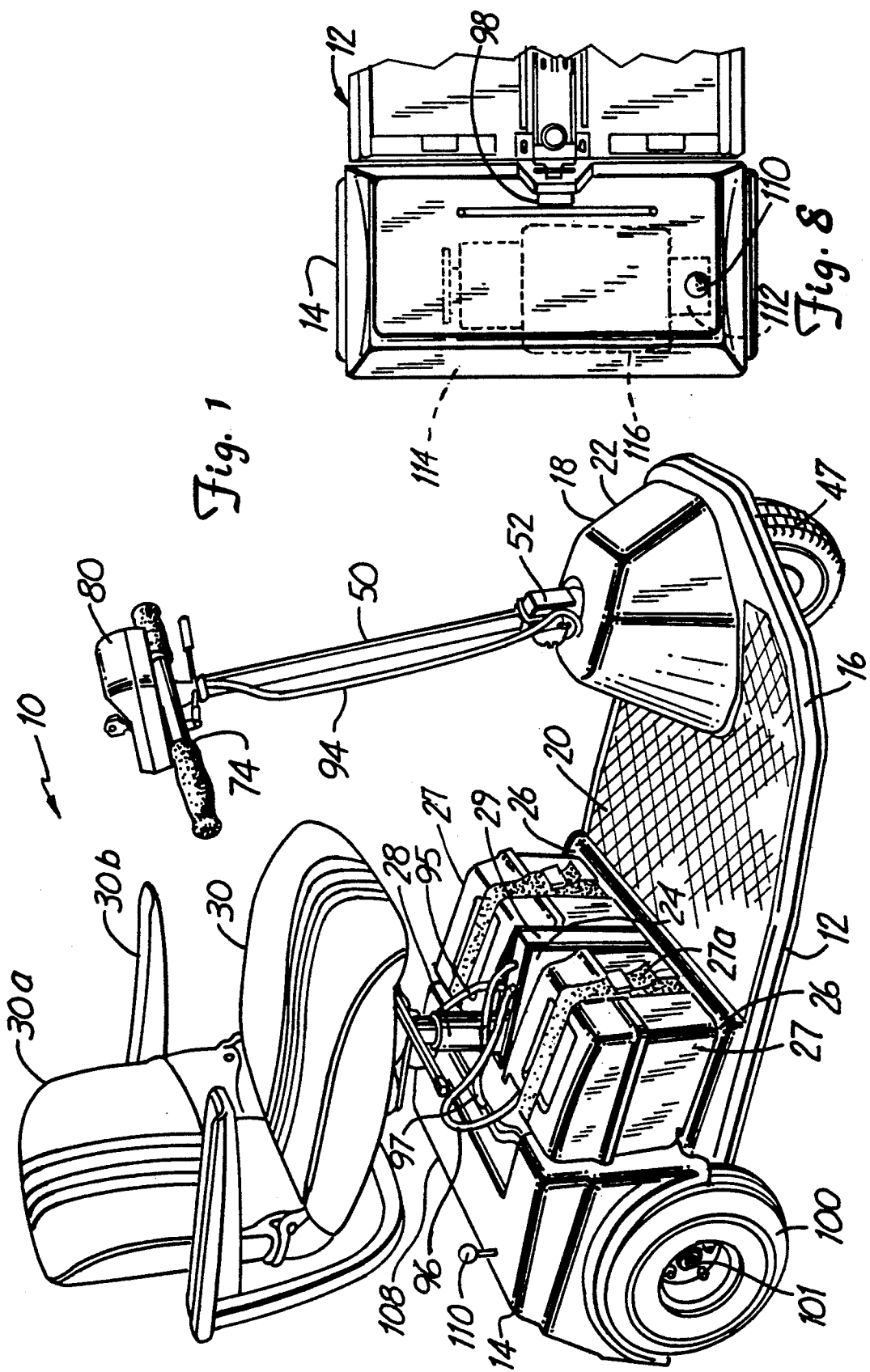
FIG. 1 is a perspective view of a personal mobility vehicle according to the presently preferred embodiment of the present invention.
Figure 2:
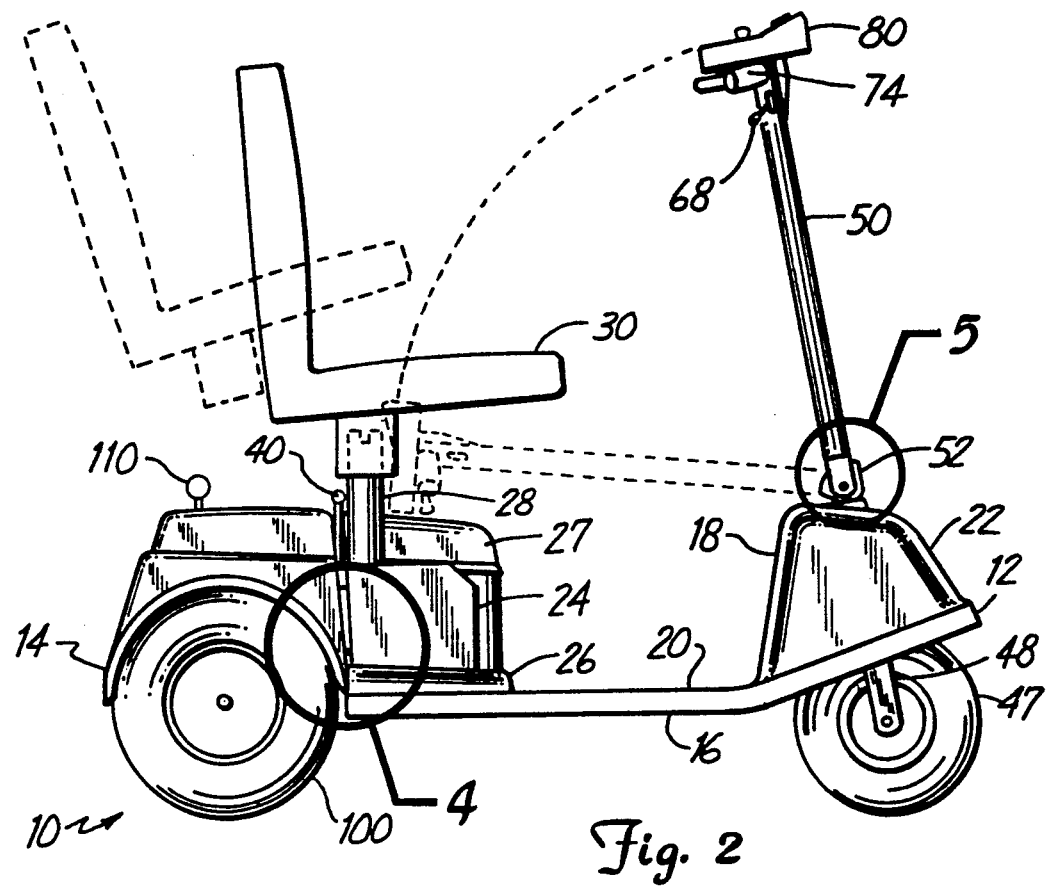
FIG. 2 is a side view of the personal mobility vehicle illustrated in FIG. 1.

FIGS. 1 and 2 illustrate a personal mobility vehicle 10 according to the presently preferred embodiment of the present invention. Vehicle 10 includes front unit 12 and rear unit 14. Front unit 12 includes frame 16 supporting front body 18 constructed of hard ABS plastic. Flat floor pan 20, forward wheel enclosure 22, and a pair of battery supports 26 are integrally formed out of body 18. Supports 26 support removable batteries 27. Preferably, the batteries are enclosed in battery enclosures, as shown, with carrying straps 27a attached to facilitate removal. Seat pedestal 24 is rigidly fastened to frame 16 and houses removable enclosure 29 containing electrical controls to be described. Seat extension 28 is rigidly fastened to pedestal 24 and extends above and behind enclosure 29 in the approximate center (from left to right) of the vehicle. Support 28 supports removable seat 30 which may include a backrest 30a and arm rests 30b, as is common in such vehicles. As shown particularly in FIGS. 3 and 4, bracket 32 is rigidly mounted to pedestal 24 and includes latch 34 having a beveled edge 36. Latch 34 is biased to its extended position by compression spring 35. Extension rod 38 connects latch 34 to T-handle 40 for manual retraction of latch 34.

Figure 3:
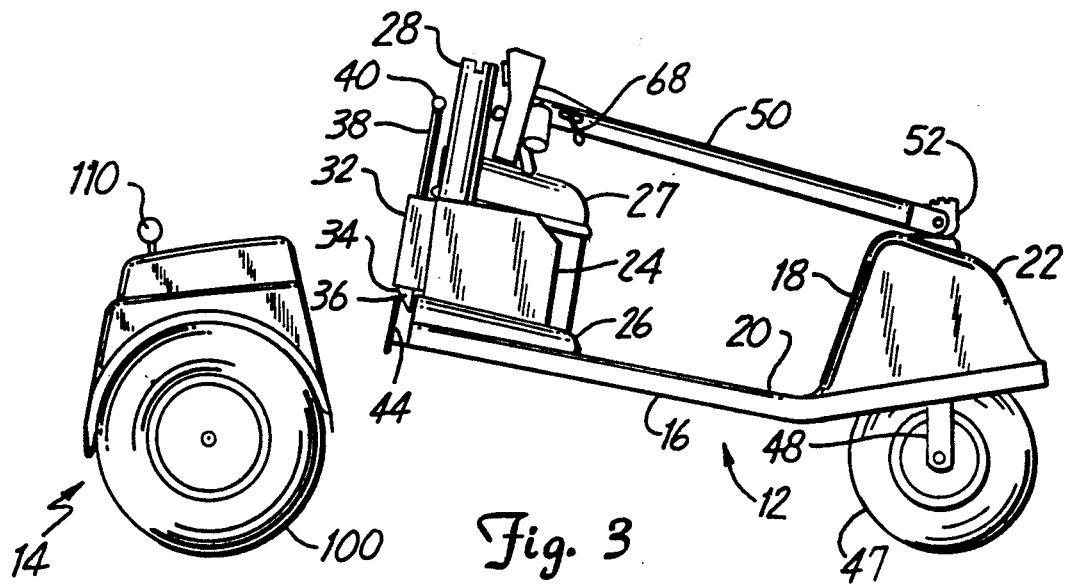
FIG. 3 is a side view, as in FIG. 2, illustrating the vehicle in a disassembled condition.
Figure 4:
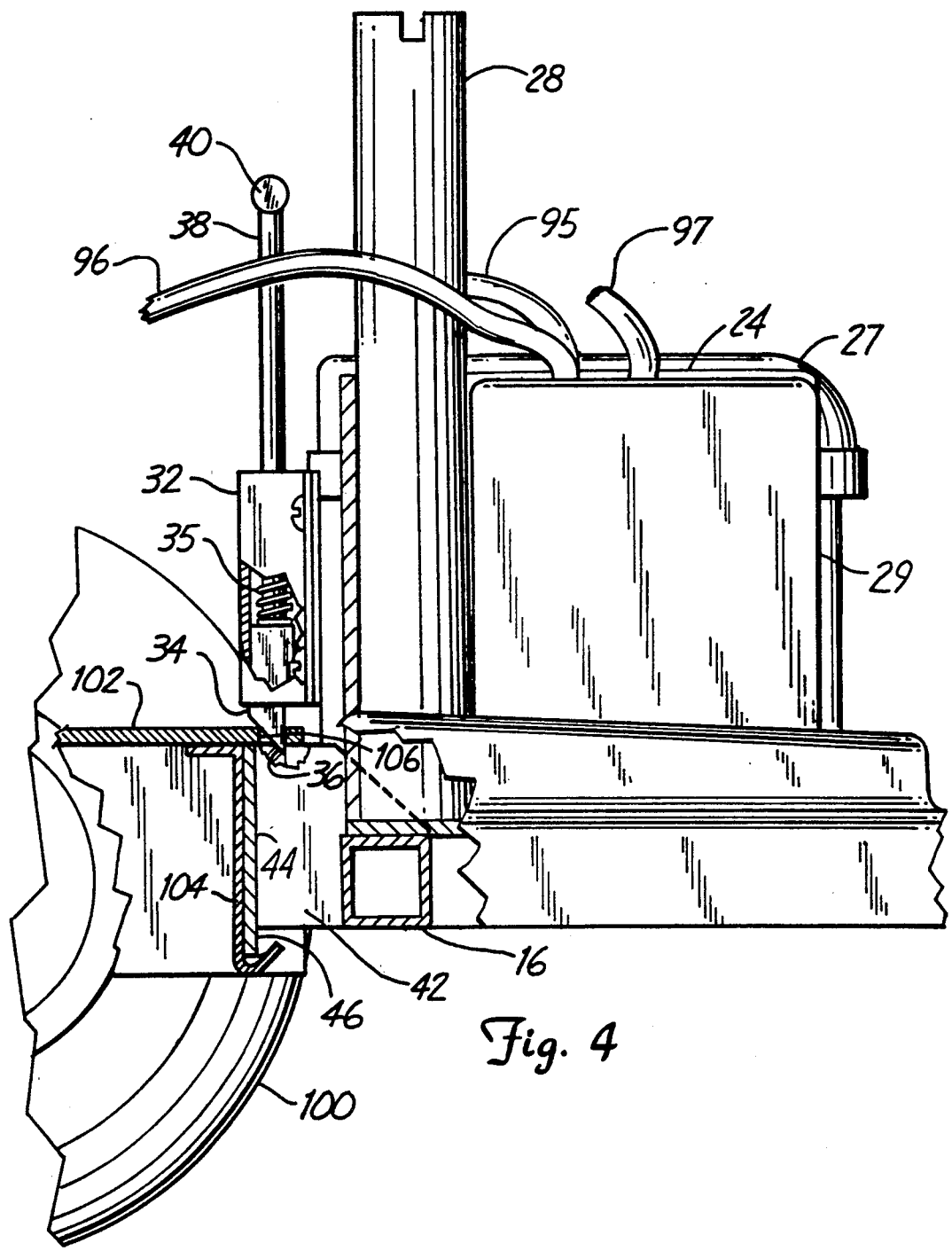
FIG. 4 is an enlarged cutaway view taken at circle 4 in FIG. 2 showing the connection mechanism for connecting the front frame portion of the vehicle to the rear frame portion.

As shown in FIG. 4, bar 44 has side flanges 42 rigidly mounted to the rear of frame 16 inboard of the sides of the vehicle. Flanges 42 are preferable welded to frame 16 so that bar 44 is in spaced relation to the frame. Bar 44 includes depending lip portion 46 extending below the frame. As shown in FIGS. 3 and 4, latch 34 is permitted to enter the region between support bar 44 and the rearward portion of frame 16.

Figure 6:
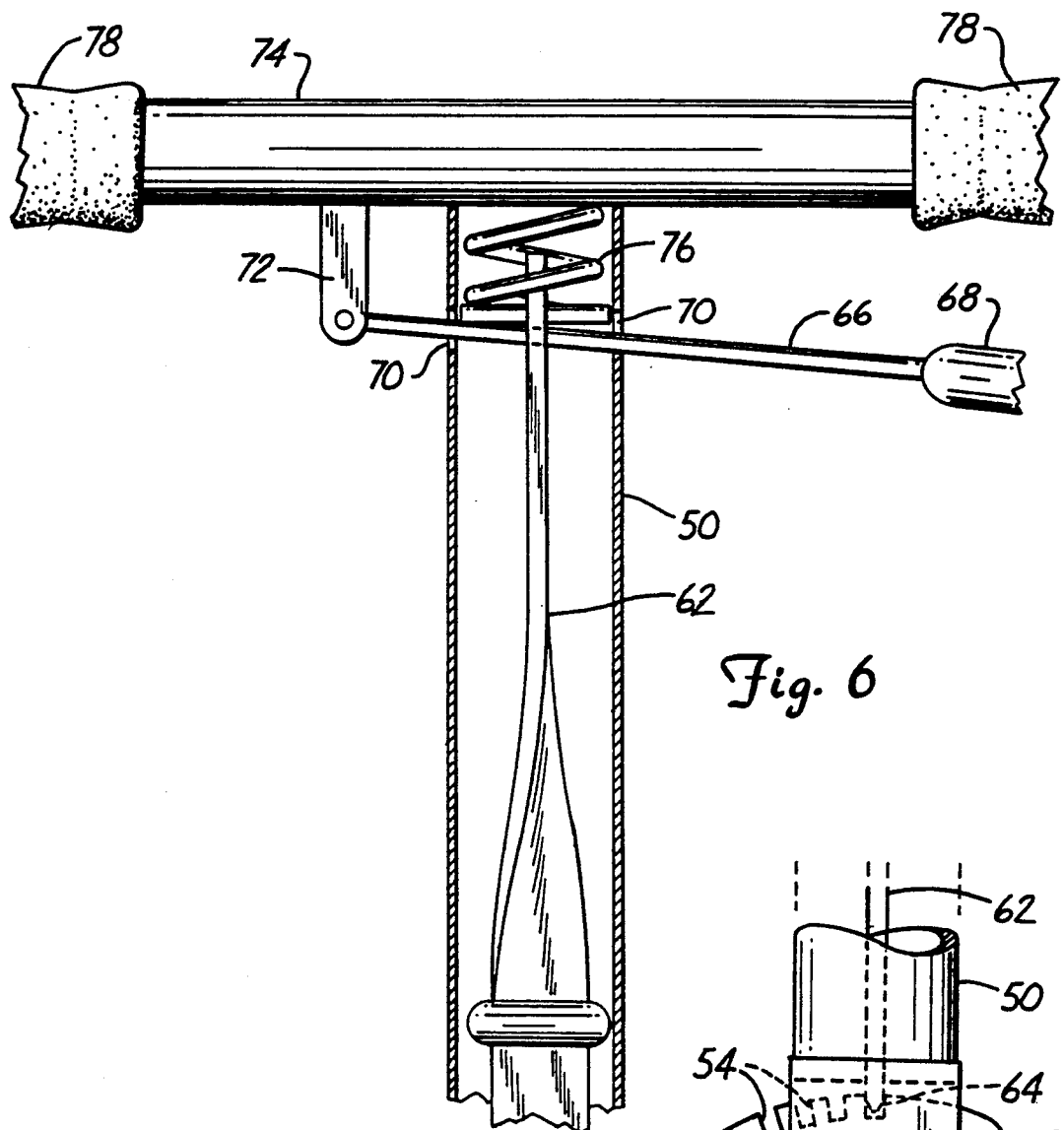
FIG. 6 is an enlarged cutaway view from the front of the vehicle illustrated in FIG. 1 showing the mechanism for operating the mechanism illustrated in FIG. 5.
Figure 5:
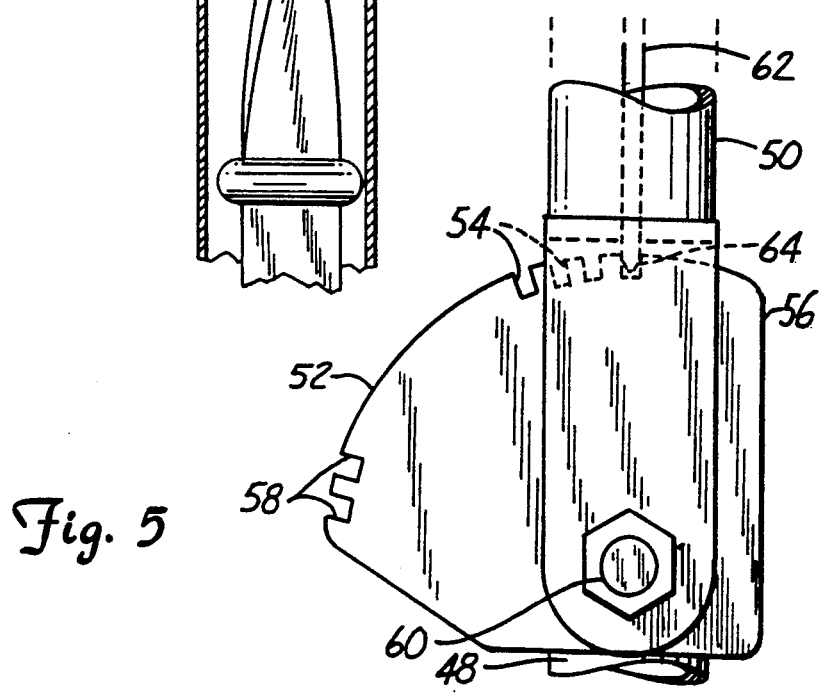
FIG. 5 is an enlarged side view taken at circle 5 in FIG. 2 showing the mechanism for adjusting and collapsing the tiller of the vehicle.

As shown particularly in FIGS. 2 and 3, front wheel 47 is journaled to forked wheel spindle 48 which in turn supports tiller 50. Although the vehicle according to the present invention is shown and described as a three-wheel vehicle with a single front wheel, it is understood that the vehicle may have two front wheels and a single rear wheel, or may be a four-wheel vehicle with two front wheels. In any case, and as shown in FIGS. 5 and 6, the upper end of spindle 48 includes bracket 52 having a plurality of first notches 54 in an upper portion of radial edge 56, and a notch 58 in a rearward portion of edge 56. Hollow tubular tiller 50 is journaled by axle 60 to bracket 52. Radial edge 56 of bracket 52 is arranged at an equal radius to axle 60 so that notches 54 and 58 are parallel to and equi-distant from axle 60. Blade 62 is located internally within tiller 50 and includes a lower end 64 arranged to engage one of notches 54 and 58. As shown in FIG. 6, Blade 62 has a 90° twist so that the upper end of the blade engages shaft 66 of operator's handle 68. Shaft 66 extends through openings 70 at diametrically opposite sides of tiller 50 and is journaled to bracket 72 mounted to handlebars 74. Compression spring 76 is positioned within tiller 50 to engage shaft 66 and handlebars 74 to bias shaft 66 downwardly, thereby biasing blade 62 downwardly to engage one of notches 54 and 58. Grips 78 are mounted to the ends of handlebars 74 for the comfort of the rider.

As shown in FIG. 7 control panel 80 is mounted to handlebars 74, and includes battery indicator 82, horn button 84, speed regulator 86 and on/off key switch 88. An actuator unit comprising left and right actuators 90 and 92, respectively, is pivotly mounted to the underside of panel 80 to control the forward and reverse motion of the vehicle. The actuator is spring-biased to a neutral or central position to provide a braking function for the vehicle, to be described. Depressing the right actuator 92 operates the vehicle in a forwardly direction, whereas depressing the left actuator 90 operates the vehicle in a rearwardly direction. Release of both actuators returns the actuator unit to its central or neutral position to brake the vehicle. For single-handed operation, one actuator may be depressed or raised with a thumb of the rider to control the forward and reverse direction of the vehicle.

The controls of control panel 80 are connected via cable 94 to enclosure 29. Enclosure 29 encloses electronic controls for the motor/brake assembly in rear unit 14, as well as provide output cables 95 and 96 to batteries 27. Cable 97 connects the electronic controls to the motor/brake assembly. Connectors (not shown) on cables 95 and 96 releasably connect to connectors (not shown) on battery units 27. A connector (not shown) on cable 97 releasably connects to connector 98 (FIG. 8) mounted to rear unit 14.

Rear unit 14 of vehicle 10 includes a pair of tires 100 mounted to axle 101 journaled to frame 102. Axle 101 is connected to gearbox 114 and reversible motor 116. Brake mechanism 112 is connected to motor 116. Motor/gearbox unit 114, 116 and brake 112 are supported by frame 102 above axle 101. Motor 116 is connected to axle 101 to drive the same. The motor/gearbox is preferably a 24-volt DC reversible motor and gearbox assembly available from Rae Corporation as their part number 900-4026-045. The motor/gearbox assembly operates in a forward or reverse direction, depending on the current from the control circuits in enclosure 29 as controlled by the control provided by actuator 90, 92. The brake is preferably a solenoid-operated brake, such as a brake available from Inertia Dynamics Corp. as their part number FSBR015-2443. The brake is connected through the control circuits in enclosure 29 to apply brake action to the motor when no current is applied from actuator 90, 92. Hence, with actuator 90, 92 in its neutral position, no current is applied to the solenoid, thereby braking the vehicle. If key switch 88 is turned off, no current is applied to the solenoid so the brake acts as a parking brake. The parking brake can be overridden by operation of knob 110 which mechanically releases the brake, even if the key switch 88 is in its off position. An interlock mechanism (not shown) is included to prevent operation of the vehicle if the brake is overridden.

As shown in FIG. 4, J-hook 104 is rigidly mounted to frame 102 and opening 106 in frame 102 is arranged to receive latch 34 of the front unit. The length of J-hook 104 extends a distance approximately equal to, or slightly smaller than the distance between the side flanges 42 positioning bar 44 at the rearward end of frame 16. Thus, J-hook 104 is received in the opening formed between flanges 42 in the region between frame 16 and bar 44 so that the two units is easily assembled and disassembled without difficulty, yet the assembly is fastened together without significant lateral movement. As shown particularly in FIGS. 2 and 3, rear body portion 108 constructed of ABS plastic encloses the motor, clutch and axle assembly, and knob 110 is manually operable to disengage the motor from the wheels, thereby permitting manual movement of the vehicle, as necessary.

With the vehicle fully assembled, the rider may operate actuators 90 and 92 (FIG. 2) to operate the vehicle in a forward or reverse direction as heretofore described. When actuators 90, 92 is in the central position, the motor is operated in a braking fashion to brake the vehicle. Knob 86 is operated to adjust the maximum speed for the vehicle to the convenience of the rider.

The vehicle is disassembled by unplugging and removing batteries and removing seat 30. Tiller 50 is moved to its collapsed position by operating handle 68 to disengage blade 62 from a notch 54 and tilting the tiller to the position shown in FIG. 3. Blade 62 is engaged to one of notches 58. T-handle 40 is pulled upwardly to disconnect latch 34 from the opening 106 in the rear frame, and to lift the rearward end of the front unit to disengage it from the rear unit. Hence, lip 46 of bar 44 is disengaged from J-hook 104, and the vehicle is separated into five units: the two batteries and seat removed separately, and the front and rear units separated by disconnecting the connector mechanism. The front unit may be picked up by grasping the T-handle and the tiller near bracket 52. The vehicle is easily stowed in a convenient location, such as the trunk of an automobile.

To reassemble the vehicle, the reverse of the disassembly procedure is accomplished. The rear unit is tilted backward to rest on frame 106 (FIG. 3). The front unit is lifted to tilt on the axis of wheel 47 and then lowered so that lip 46 of bar 44 is lowered into and engages the recess formed by J-hook 104 The two units are lowered to their assembled position so that beveled edge 36 of latch 34 engages the frame 102 until the latch is received in opening 106 therein. With the front and rear units assembled, bar 44 engages and confronts against the broad leg of J-hook 104. As a result, any downward force, such as the weight of the vehicle or rider, is supported at the connection by compression force of bar 44 against J-hook 104.

Tiller 50 is returned to its operating position and blade 62 engages a selected one of notches 54. Operation of handle 68 permits adjustment of the tiller position to any convenient position, depending on the selection of the notch 54 to which the blade 62 is engaged. Batteries 27 are positioned on the floor pan as indicated and reconnected to the controls in enclosure 29. Seat 30 is positioned on seat support 28 and locked in position.

The present invention thus provides a personal mobility vehicle having a positive connection mechanism between the front and rear units which is quickly operated for both assembly and disassembly of the vehicle. The connection unit operates in compression to support the weight of the vehicle and rider, thereby positively supporting the rider and providing a high safety factor for the rider. The personal mobility vehicle according to the present invention is rugged, yet simple in design, requiring little maintenance.

Although the present invention has been described with reference to preferred embodiments, workers skilled in the art will recognize that changes may be made in form and detail without departing from the spirit and scope of the invention.

What is claimed is:

1. In a mobility vehicle having a frame and a wheel spindle mounted to said frame, the improvement comprising a collapsible tiller assembly comprising:
   a bracket mounted to said spindle,
   a tiller having a first end and a second end, the first end of the tiller being pivotally mounted to said bracket, manually-operable steering means mounted to the second end of the tiller, the tiller being pivotable between at least first and second positions.
   a plurality of slots on said bracket arranged generally parallel to the axis of the pivot mount of said tiller to said bracket, at least one of said slots defining said first position and at least another of said slots defining said second position,
   an engaging blade supported by said tiller for selectively engaging one of said slots,
   bias means biasing said blade to engage the selected slot, and
   manually operable means operatively connected to the blade to disengage said blade from a slot to permit the tiller to pivot between its first and second positions, and means supporting the manually operable means on the tiller proximate the steering means.

2. The apparatus according to claim 1 wherein there are a plurality of slots on the bracket defining a plurality of different operating positions of the tiller, the tiller being adjustable to different operating positions by manual operation of the manually operable means proximate the steering means.

* * * * *